March 22, 1938.   C. H. B. JARL ET AL   2,112,024
PROCESS AND APPARATUS FOR CONDENSATION OF SUBLIMABLE MATERIAL
Filed March 24, 1937
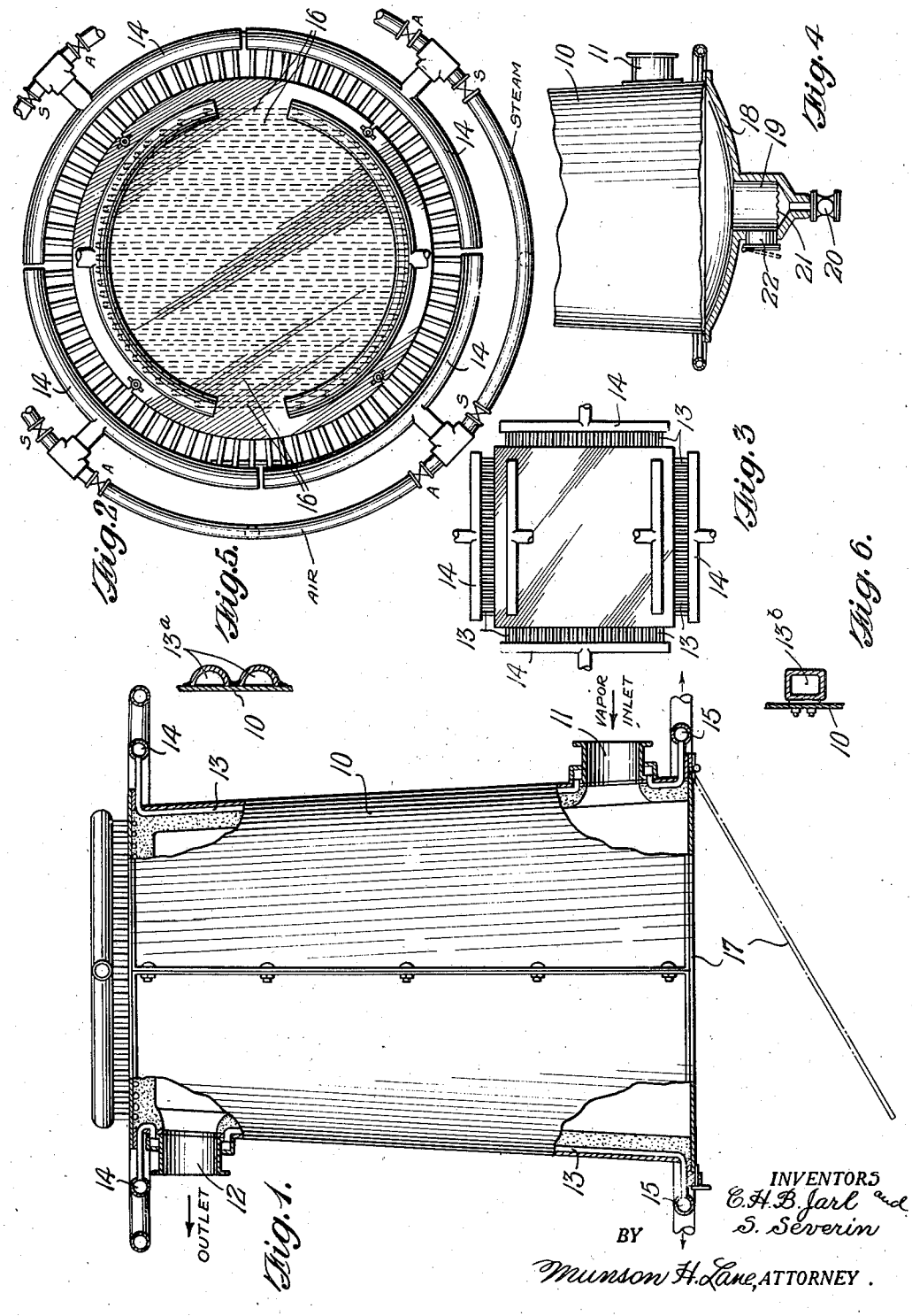
INVENTORS
C.H.B. Jarl and
S. Severin
BY Munson H. Lane, ATTORNEY.

Patented Mar. 22, 1938

2,112,024

UNITED STATES PATENT OFFICE 2,112,024

PROCESS AND APPARATUS FOR CONDENSATION OF SUBLIMABLE MATERIAL

Carl H. B. Jarl and Sten Severin, Royal Oak, Mich., assignors to Beck, Koller & Company, Inc., Detroit, Mich Application March 24, 1937, Serial No. 132,855

2 Claims. (Cl. 260—123)

The invention relates to the condensation of sublimable organic solid materials such as phthalic anhydride, benzoic acid, naphthalic anhydride, beta naphthol and the like.

The present forms of condensing apparatus generally consist of vertical cylindrical condensers which are cooled by the outside air and are provided with various scraper arrangements, the purpose of which is to maintain an effective cooling surface by scraping off the condensed material as it forms on the inside walls of the apparatus.

Our invention consists of an apparatus of very much simplified design eliminating the cumbersome and expensive scraping devices. According to our invention the condenser is provided with walls tapering from the bottom upwadly, the apparatus being equipped with means for initially cooling and condensing the gases entering the apparatus and also with means for subsequently loosening the solid material which has collected on the walls of the container so that such condensed materal may slide down in a mass and be removed at the bottom of the container into a suitable box or collector.

The invention will be more readily understood by reference to the accompanying drawing and the further detained description in which are set forth the various illustrative embodiments of the inventive thought.

In the drawing:

Fig. 1 is a side elevation of a frusto conical condenser embodying our invention.

Fig. 2 is a top plan view of the same.

Fig. 3 is a top plan view of a modified condenser of rectangular cross-section.

Fig. 4 is a fragmentary view showing the lower part of a further modified form of the condenser.

Fig. 5 is a detail section showing semi-circular tubes for the heat exchange media.

Fig. 6 is a detail showing the tubing of square cross-section.

Condensers embodying the principles set forth herein have been successfully employed by us for condensing sublimable material such as phthalic anhydride produced by catalytic oxidation of naphthalene with air.

In Fig. 1 the condenser is shown as provided with tapering walls 10 which are substantially wider at the bottom than at the top. The casing or shell forming the container may be made in sections if desired and as shown is in the form of a tapered conical frustrum but it will be understood that the condenser may be of any desired cross-section as for example triangular, rectangular, oval or circular. In Fig. 3 a frustrum of a pyramid of square cross-section is illustrated.

Vapors to be condensed enter the shell at 11 and the uncondensed gases pass off at 12. If desired the vapors to be condensed may enter at the top and leave at the bottom. Within the walls of the container there are provided suitable heat exchange elements 13 extending from top to bottom and connected to manifolds 14 and 15 preferably in sections of about twenty elements. These elements 13 may be welded directly to the walls and may be of any suitable shape. In Fig. 5 the heat exchange elements 13a are shown as semi-circular and in Fig. 6 the elements 13b are shown as of rectangular cross-section and bolted instead of welded to the wall 10. Heat exchange units 16 also preferably extend over the top of the device as well as along the sides so that uniform heating is assured.

During the condensing operation a cooling medium is supplied through the elements 13 for the purpose of condensing the sublimable materials contained in the vapors passing through the apparatus. Air may be suitably employed for this purpose and is preferably passed in counter-current relation to the vapors passing through the apparatus containing such condensable materials as phthalic anhydride. As the phthalic anhydride or the like is condensed it is deposited on the walls and cooling elements and in this manner the cooling effect is gradually reduced. When the point has been reached that the cooling becomes ineffective the vapors and cooling medium are cut off and the apparatus is then cleaned out. This is accomplished according to our invention by supplying a heating medium such as steam through the heat exchange elements. The steam is preferably supplied under pressure and its use is continued until the condensed materials are loosened from the walls and fall down into a suitable container beneath the condenser. In Fig. 1 the hinged bottom 17 is provided to permit the phthalic anhydride to be removed in the form of a cake or solid mass.

In Fig. 4 a collector 18 is shown at the bottom of the condenser, such collector having a rounded surface with a sump 19 at the center and an offtake pipe 20. The bottom surface of this collector is adapted to be heated in any suitable manner for the purpose of melting the solid cake. As shown a strainer may be provided at 21 and a clean-out opening at 22. The melted material may be withdrawn through the off-take pipe 20.

A number of the condensers embodying the invention may be arranged in battery, the vapors to be condensed passing upwardly through one condenser and downwardly through the next. Such condensers will be connected to suitable converters in which the gases containing phthalic anhydride or other material to be collected will be produced.

We claim:—

1. Apparatus for the recovery of phthalic anhydride and the like from vapors containing the same, comprising an upright condenser shell tapering gradually from the bottom upwardly, a vapor inlet adjacent the one end of the shell and an outlet for uncondensed gases adjacent the opposite end of the shell, a series of parallel upright heat interchange pipes lining and contacting the interior of the shell, means for supplying a cooling medium to said heat interchange pipes for condensing the phthalic anhydride contained in said vapors, and means for supplying a heating fluid to said pipes, the interior of the shell being unobstructed and the arangement of pipes and inclination of the walls and tubes being such that on being heated to loosen an accumulation of condensed solid material said accumulation will drop in a solid and substantially large mass to the bottom of the condenser for discharge therefrom.

2. A process for the recovery of sublimable material selected from a group consisting of phthalic anhydride, benzoic acid, naphthalic anhydride and beta naphthol, from vapors containing it, which comprises passing said vapors through an unobstructed upright condenser which tapers from the bottom upwardly and which is provided internally with vertically extending heat interchange pipes contacting the wall portion, passing a cooling fluid through said heat interchange pipes to cause the sublimable material to condense thereon in the solid state, and continuing the cooling operation until a cake of sublimable material is formed which is of sufficient thickness to interfere with the efficiency of the condensation, then supplying a heating fluid to said heat interchange pipes until a layer of the collected mass in contact with said pipes is caused to melt, thereby loosening the mass and permitting it to fall by gravity to the bottom of the condenser.

CARL H. B. JARL.
STEN SEVERIN.